United States Patent [19]

Kazaoka et al.

[11] Patent Number: 4,725,032
[45] Date of Patent: Feb. 16, 1988

[54] SEAT SLIDE ADJUSTER FOR VEHICLES

[75] Inventors: Kenichi Kazaoka, Nagoya; Hiroshi Okazaki, Kariya; Fumio Wakamatsu, Okazaki, all of Japan

[73] Assignee: Aisin Seiki Kabushiki Kaisha, Japan

[21] Appl. No.: 905,964

[22] Filed: Sep. 11, 1986

[30] Foreign Application Priority Data

Sep. 20, 1985 [JP] Japan .................. 60-208367

[51] Int. Cl.⁴ .............................. B60N 1/08
[52] U.S. Cl. .................... 248/430; 384/50; 384/34; 248/420; 297/346
[58] Field of Search ............ 248/430, 429, 420, 393, 248/424, 419; 297/346, 322, 329; 384/18, 19, 50, 34

[56] References Cited

U.S. PATENT DOCUMENTS

| | | | |
|---|---|---|---|
| 2,907,371 | 10/1959 | Scott | 248/419 |
| 2,942,646 | 6/1960 | Himka et al. | 248/419 X |
| 2,970,015 | 1/1961 | Ragsdale . | |
| 3,049,329 | 8/1962 | Eddy | 248/419 X |
| 3,450,425 | 6/1969 | Leonhardt | 248/430 X |
| 3,450,446 | 6/1969 | Fall et al. | 384/19 |
| 4,624,498 | 11/1986 | Nagashima et al. | 248/430 X |
| 4,671,571 | 6/1987 | Gionet | 248/419 X |
| 4,687,251 | 8/1987 | Kazaoka et al. | 248/419 X |

Primary Examiner—Ramon S. Britts
Assistant Examiner—Karen J. Chotkowski
Attorney, Agent, or Firm—Finnegan, Henderson, Farabow, Garrett & Dunner

[57] ABSTRACT

A vehicular seat slide adjuster has a lower rail fixed to a vehicle body and an upper rail to which a seat cushion frame is attached, the upper and lower rails being engaged with each other in sliding relation. The lower rail includes a vertical wall portion, upper and lower horizontal wall portions projecting from respective edges of the vertical wall portion, and flange portions extending downwardly from respective ones of the horizontal wall portions. The upper rail includes a vertical wall portion opposing the vertical wall portion of the lower rail in spaced relation, horizontal wall portions opposing the horizontal wall portions of the lower rail in spaced relation, and flange portions opposing the flange portions of the lower rail. Small balls are arranged between the opposing flange portions of the upper and lower rails, a roller is disposed between and in contact with the opposing horizontal wall portions of the upper and lower rails, and a large balls are disposed between and in contact with the opposing vertical wall portions of the upper and lower rails.

2 Claims, 6 Drawing Figures

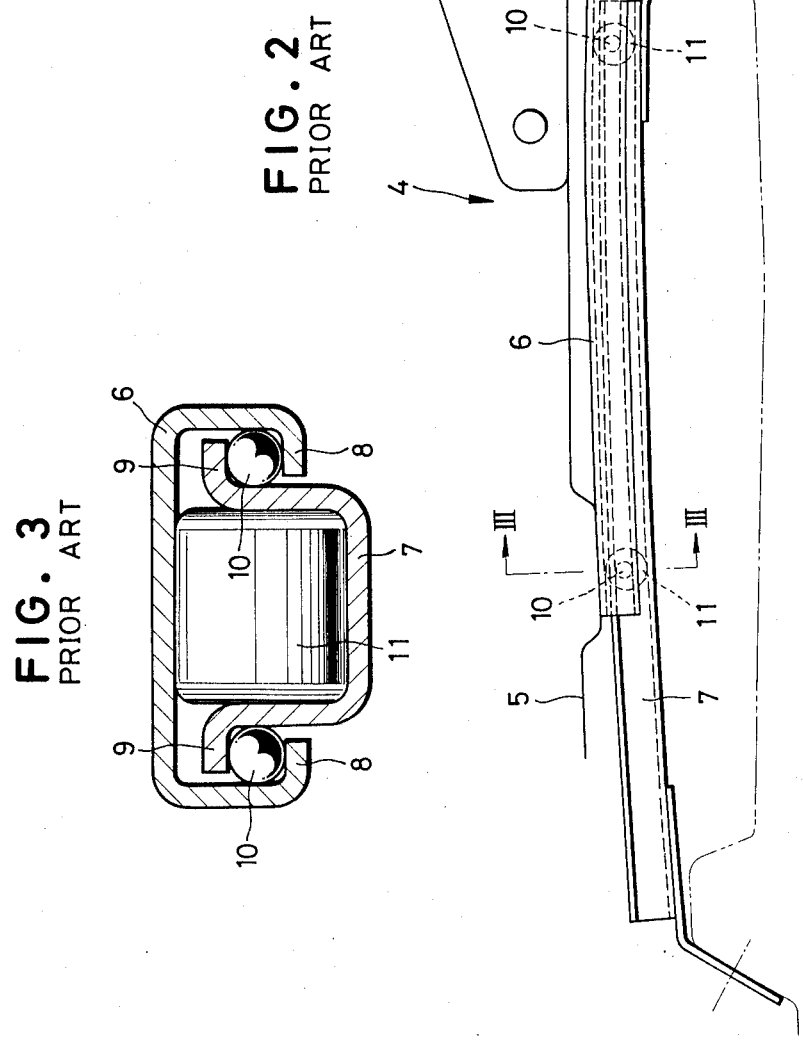

SEAT SLIDE ADJUSTER FOR VEHICLES

BACKGROUND OF THE INVENTION

1. Field of the Invention

This invention relates to a seat slide adjuster for vehicles, particularly a seat slide adjuster that is highly rigid and light in weight.

2. Description of the Prior Art

As illustrated in FIG. 1, a seat 1 for a vehicle comprises a seat back 2 and a seat cushion 3 and is supported on a vehicle body by a seat slide adjuster. It is required that the seat slide adjuster 4 be light in weight in view of reducing fuel consumption, of high strength for the sake of safety, and of high rigidity to provide a seated individual with a feeling of stability. A typical conventional seat slide adjuster of this kind is disclosed in the specification of U.S. Pat. No. 2,970,015 and is illustrated in FIGS. 2 and 3. The seat slide adjuster 4 comprises an upper rail 6 secured to a seat cushion frame 5, and a lower rail 7 secured to the vehicle body. As shown in FIG. 3, the upper rail has a generally C-shaped cross section and includes flange portions 8 on both sides, and the lower rail 7 has a generally U-shaped cross section and likewise includes flange portions 9 on both sides. The lower rail 7 is inserted into the upper rail 6 longitudinally thereof in such a manner that the flange portions 8, 9 oppose each other. Small balls 10 are arranged between these opposing flange portions, and rollers 11 are disposed between the upper and lower rails 6, 7. The rollers 11, as well as the small balls 10, are located at the front and rear and, hence, are spaced apart from each other, as shown in FIG. 2. Since sliding movement of the upper rail 6 relative to the lower rail 7 in the longitudinal direction causes the small balls 10 and rollers 11 to roll and act as bearings, the upper rail 6 has very little sliding resistance.

A downwardly directed load acting upon the upper rail 6 is received by the rollers 11, an upwardly directed stripping load is received by the small balls 10 at upper and lower points thereon, and a lateral load acting on the upper rail 6 is received by the small balls 10 at left and right points thereon. This assures that the upper rail 6 will slide smoothly with respect to the lower rail 7. However, in the state shown in FIG. 2, when a heavy individual sits down in the seat or leans back on the seat back, or when the seat back is subjected to a large load as may be sustained in a collision, the rails 6, 7 flex and may even bend and, hence, may no longer assure the necessary safety. This problem derives from the fact that the rails 6, 7 have but a small height-wise dimension and therefore exhibit a low section modulus.

A conventional attempt to solve the aforementioned difficulty is disclosed in the specification of Japanese Patent Application Laid-Open (Kokai) No. 57-90225. In this example of the prior art, a first rail having a generally I-shaped cross section is combined with a second rail having a generally C-shaped cross section, rollers are arranged at the top and bottom of the first rail and receive upwardly and downwardly directed loads, and a lateral load is received by bringing protuberances located at the sides of the rollers into contact with the inner wall surface of the second rail. However, this arrangement is disadvantageous in that the protuberances increase the sliding friction of the rails and cause looseness ascribable to wear.

SUMMARY OF THE INVENTION

Accordingly, an object of the present invention is to provide a vehicular seat slide adjuster which provides higher rail rigidity while at the same eliminating the above-described disadvantage encountered in the prior art attempt at a solution.

Another object of the invention is to provide a vehicle seat slide adjuster having rails that can be reduced in thickness without detracting from the strength of the rails.

According to the present invention, the foregoing objects are attained by providing an improved vehicular seat slide adjuster of the type having a lower rail fixed to a vehicle body and an upper rail to which a seat cushion frame is attached, the upper and lower rails being engaged with each other in sliding relation. According to the invention, the lower rail comprises a vertical wall portion having upper and lower edges, horizontal wall portions projecting from respective upper and lower edges of the vertical wall portion and having an edge, and a flange portion extending downwardly from the edge of each of the horizontal wall portions. The upper rail comprises a vertical wall portion opposing the vertical wall portion of the lower rail in spaced relation, horizontal wall portions opposing the horizontal wall portions of the lower rail in spaced relation, and flange portions opposing the flange portions of the lower rail. Small balls are arranged in spaces defined by the opposing horizontal wall portions and the opposing flange portions of the upper and lower rails, a roller for rolling with respect to the opposing horizontal wall portions of the upper and lower rails, and a large ball contacting the opposing vertical wall portions of the upper and lower rails, are arranged in a space defined by the opposing vertical wall portions and the opposing horizontal wall portions.

According to the invention, the rails have a large height-wise dimension in the longitudinal direction and therefore exhibit a high section modulus with respect to upwardly and downwardly directed loads, as well as high bending strength and rigidity. Furthermore, since loads acting in the lateral direction are received by the large and small balls, load bearing quality is improved and sliding resistance can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a side view of a seat slide adjuster according to the prior art;

FIG. 3 is a sectional view taken along line III—III of FIG. 2

DESCRIPTION OF THE PREFERRED EMBODIMENT

Figure 1:
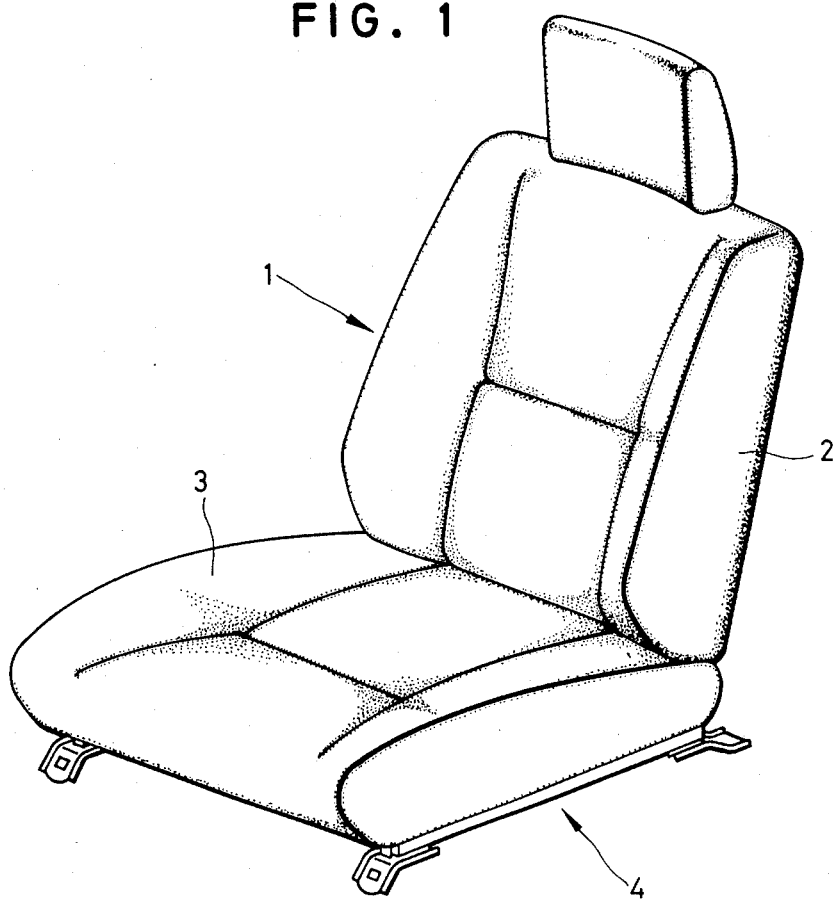
FIG. 1 is a perspective view illustrating a seat for a vehicle.
Figure 4:
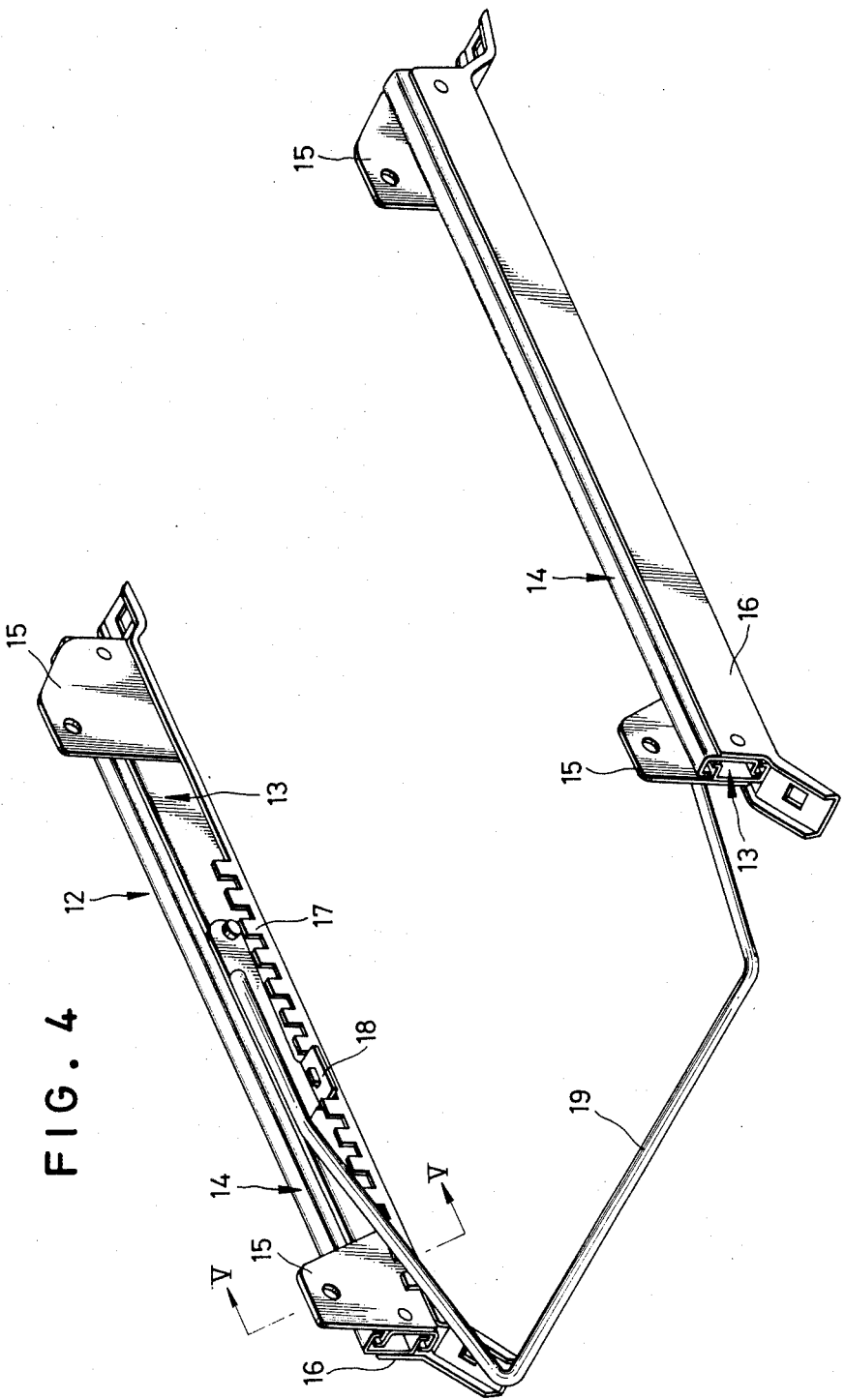
FIG. 4 is a perspective view illustrating an embodiment of a seat slide adjuster according to the present invention.
Figure 5:
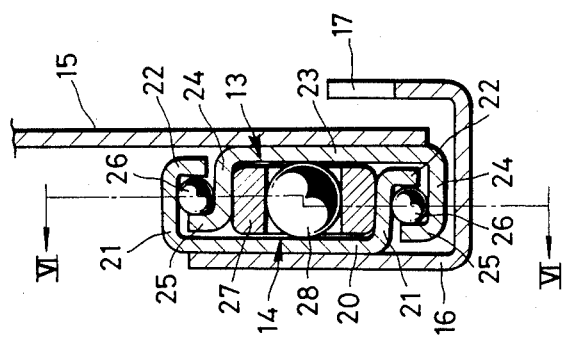
FIG. 5 is a sectional view taken along line V—V of FIG. 4.
Figure 6:
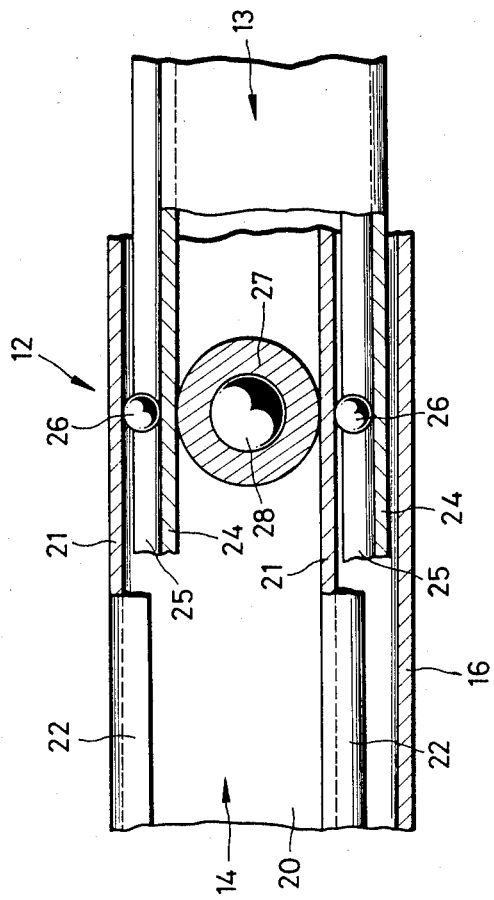
FIG. 6 is a sectional view taken along line VI—VI of FIG. 5.

Reference will now be had to FIGS. 4 through 6 to describe a seat slide adjuster embodying the present invention.

The seat slide adjuster of the invention, shown generally at numeral 12 includes an upper rail 13 and a lower rail 14. Fixedly secured to the upper rail 13 at the front and rear ends thereof are brackets 15 to which a seat cushion frame, not shown, is attached. The lower frame 14 is secured to a bracket 16, which is fixed to the vehicle body, not shown. The bracket 16 is formed to include a row of upstanding locking projections 17 along its length. Provided on the side of the upper rail 13 is a slotted plate 18 acting as a pawl for being brought into and out of engagement with any one of the projections 17 so that the upper rail 13 may be slid with respect to the lower rail 14 and then locked at a desired position. The slotted plate 18 is coupled to an operating handle 19 manipulated by the seated individual in an ordinary manner to control the engagement between the plate 18 and the locking projections 17.

The lower rail 14 comprises a vertical wall portion 20, horizontal wall portions 21 projecting from respective ends of the vertical wall portion 20, and a flange portion 22 extending downwardly from the free end of each horizontal wall portion 21. The upper rail 13 comprises a vertical wall portion 23, horizontal wall portions 24 projecting from respective ends of the vertical wall portion 23, and a flange portion 25 extending upwardly from the free end of each horizontal wall portion 24.

The rails 13, 14 are brought into longitudinal sliding engagement with each other so that the flange portions 22, 25, as well as the vertical wall portions 20, 23, oppose each other in spaced relation. The bracket 15 is fixed to the vertical wall portion 23 of the upper rail 13 and, and the bracket 16 having the locking projections 17 is fixed to the vertical wall portion 20 of the upper rail 13.

Small balls 26 are arranged in the space delimited by the flange portions 22, 25 and horizontal wall portions 21, 24 so as to contact the surfaces of these portions, and a roller 27 is arranged between the horizontal wall portions 21, 24 so as to contact the surfaces thereof. A large ball is disposed within the roller 27 so as to contact the vertical wall portions 20, 23. It is of course possible to replace the large ball 28 with a roller having the same function. It is also permissible to place the large ball 28 (or the roller if this is substituted for the ball 28) in juxtaposition with the roller 27 rather than inside the roller 27. When the upper rail 13 is slid along the lower rail 14, the small balls 26, roller 27 and large ball 28 roll to reduce the sliding resistance between the rails 13, 14.

The rails 13, 14 are formed in such a manner that their vertical wall portions 20, 23 are longer than their horizontal wall portions 21, 24, respectively, thus providing the rails 13, 14 with a height dimension greater than the lateral dimension thereof, as best shown in FIG. 5. As a result, the rails have a high section modulus with respect to large upwardly and downwardly directed loads and therefore exhibit greater bending strength and higher rigidity. A downwardly directed load is received by the roller 27, an upwardly directed stripping load by the small balls 26, and laterally acting loads by the large ball 28 and small balls 26. Of particular note is that the rolling motion of the large ball 28 reduces the sliding friction between the upper rail 13 and lower rail 14 when the former is slid along the latter.

Since the two flange portions 22, 25 resist the rail stripping load via the small balls 26, a large resisting force is developed. As a result, even if the plates constituting the rails are reduced in thickness, there is no decrease in strength. By improving the strength of the rails in accordance with the invention as set forth above, it becomes possible to attach the vehicle seat belts to the rails.

As many apparently widely different embodiments of the present invention can be made without departing from the spirit and scope thereof, it is to be understood that the invention is not limited to the specific embodiments thereof except as defined in the appended claims.

What is claimed is:

1. An adjustment mechanism for a vehicle seat comprising:

a lower rail adapted to be fixed within a vehicle;

an upper rail slidably mounted on said lower rail, said lower rail including a first vertical wall portion having first upper and lower edges, first horizontal wall portions projecting from respective first upper and lower edges of said first vertical wall portion and having an end surface, and a first flange portion extending downwardly from said end surface of each of said first horizontal wall portions;

said upper rail having a second vertical wall portion spaced from and parallel to said first vertical wall portion, second horizontal wall portions extending from opposite ends of said second vertical wall portion, said second horizontal wall portions of said upper rail being spaced substantially parallel to said first horizontal portions, and second flange portions extending upward from said second horizontal wall portions, said second flange portion being spaced from and parallel to said first flange portions of said lower rail;

first balls positioned in spaces defined by said first and second horizontal wall portions and said first and second flange portions of said upper and lower rails;

a hollow roller rotatably engaging said first and second horizontal wall portions for smoothly sliding said upper rail relative to said lower rail, a second ball rotatably mounted within said hollow roller, said second ball being larger in size than said first balls and rotatably engaging said first and second vertical wall portions of said upper and lower rails, said roller and said second ball aligned between said first and second vertical wall portions and also between said first and second horizontal wall portions, said first and second vertical wall portions of the upper and lower rails having a substantially greater length than said first and second horizontal wall portions of the upper and lower rails.

2. The adjustment mechanism according to claim 1, also including brackets supporting a seat cushion frame, said brackets being fixed to said second vertical wall portion.